3,223,481
PRODUCTION OF ORTHOPHOSPHATES

Karl Geiersberger, Cologne-Deutz, Kurt Tesche, Lovenich-Cologne, and Gotz-Dieter Woitas, Cologne-Ostheim, Germany, assignors to Chemische Fabrik Kalk G.m.b.H., Cologne-Kalk, Germany
No Drawing. Filed Jan. 18, 1962, Ser. No. 167,164
Claims priority, application Germany, Jan. 28, 1961, C 23,269
4 Claims. (Cl. 23—109)

This invention relates to the production of finely divided orthophosphates having very low bulk weight.

The phosphoric acid produced in wet processes from rock phosphate, in addition to other impurities, as is known, usually contains a large part of the fluorides which are introduced into the process by ingredients of the rock phosphate. The fluoride content of such a phosphoric acid can be lowered with simultaneous lowering of its water content according to a known process in which phosphoric acid is heated to 170° C. in two steps and is then sprayed with slight pressure into an evaporating or vaporizing chamber in which a reduced pressure or partial vacuum is maintained. The steam from the sprayed phosphoric acid and the volatile fluorine compounds in addition to other volatile ingredients are extracted in this evaporating or vaporizing chamber. A highly concentrated phosphoric acid having a $P_2O_5$ content of 60 to 65% results as an end product which still cotains 0.2 to 0.3% fluorine. This fluorine content is sufficiently small that the dicalcium phosphate obtained from this phosphoric acid by reaction with corresponding amounts of calcium compounds, as, for example, calcium carbonate, calcium oxide and calcium hydroxide, can be employed as a food for domestic animals and livestock. In addition to being reacted with calcium compounds, the defluoridized phosphoric acid from these processes can also be reacted with other elements of the second group of the periodic system and with aluminum compounds. The phosphates produced, however, usually have a very high bulk weight.

It is therefore an object of this invention to provide a simple process for obtaining finely divided orthophosphates of metals of the second group of the periodic system and aluminum which have very low bulk weight.

Such a process was found whereby phosphoric acid is mixed with salts that contain a metal of the second group of the periodic system or aluminum as the cation and an anion of a strong volatile acid as the anionic component. The mixture of the salt and phosphoric acid being such as to provide a $MeO:P_2O_5$ or $Me_2O_3:P_2O_5$ molar ratio of 0.6 to 3.5. The resulting mixtures which are clear solutions or pastes are sprayed into an inert hot gas stream flowing counter or concurrently thereto at temperatures of 190° to 450° C.

Advantageously, the starting mixture can be preheated to temperatures of 70 to 120° C.

For carrying out the process according to this invention, salts of metals of the second group of the periodic system or aluminum wherein one of the named metals is the cation and an anion of a strong volatile mineral acid, as, for example, hydrochloric, nitric or sulfuric acid, is the anionic component can be employed. These salts are mixed with phosphoric acid in such molar ratios that the cation introduced by such salts and $P_2O_5$ are in the proportion desired in the orthophosphate to be produced. The water content of the starting mixture produced in this manner is adjusted essentially according to the particle size of the salts employed. The starting mixtures which are produced with very finely divided salts can be used in the form of a suspension or paste in carrying out the process of the invention. On the other hand, when the starting mixture is produced out of coarser or larger salts and phosphoric acid and still contains large quantities of solid phase which tend to settle out, it is advantageous to dissolve such solid phase by adding a corresponding amount of water before the spraying operation.

Solutions which are obtained by decomposing rock phosphates with a mixture of nitric acid and phosphoric acid and filtering off the solid residues can also be employed according to the invention for the production of calcium phosphates. In rock phosphate decomposition products which have been formed with $HNO_3$ only, the desired $CaO:P_2O_5$ molar ratio, when necessary, can be regulated by depositing and separating calcium nitrate or by adding phosphoric acid. In decomposing of the rock phosphate with a mixture of nitric and phosphoric acid the amount of phosphoric acid introduced for decomposition is regulated so that the decomposition products contain CaO and $P_2O_5$ in a molar ratio which should exist in calcium phosphate to be produced according to the invention.

The starting solution can be sprayed countercurrently or concurrently into an inert hot gas stream, the temperature of which should be between 190 and 450° C. An improvement of the heat balance of the process of the invention can moreover be established by heating the starting mixtures to temperatures of 70 to 120° C. before spraying.

The spraying procedure is advantageously carried out in a spray tower with the aid of a single or double substance spray nozzle. The tower is so dimensioned that the sprayed mixture can pass through it in the shortest possible time. The single substance nozzle introduces the starting mixture to be sprayed under a pressure of 2 to 3 atmospheres from a container or reservoir, which is heated if possible. The starting mixture can be sprayed out of the double substance nozzle by means of air or steam. When steam is used as the spraying gas, the starting mixture is advantageously preheated to temperatures of 100 to 120° C. so as to avoid excessive condensation of the water vapor. When air is used as the spraying gas in place of steam, the starting mixture does not need to be preheated; but if a preheated starting mixture is used, its temperature should not be over 90° C.

When phosphoric acid obtained from fluorine containing rock phosphate in a wet process is used as a starting material for carrying out the process of the invention, the starting mixture produced contains a large part of the original fluorides present in the rock phosphate. The same is true when the starting mixtures are obtained from fluorine containing rock phosphates by treatment with nitric acid and phosphoric acid. However, the principal amount of the fluorine content is volatilized during the spraying operation.

The volatile acids set free from the sprayed material can be recovered according to known processes from the exhaust gases leaving the spraying apparatus and be recycled in the process of the invention or used in another way.

The phosphates, especially the calcium phosphates, obtained in the process of the invention as very finely divided end products surprisingly have very low bulk weights. They are similar in their properties to finely divided silicon dioxide products produced in a vapor phase process available under the tradename of Aerosil (or Cabosil) and can be used as these, for example, as fillers.

The following examples illustrate the invention.

Example 1

5,000 parts by weight of a phosphoric acid containing 27.6% $P_2O_5$ and 0.27% fluorine (fluorine factor=parts by weight $P_2O_5$/parts by weight F=102.2) were mixed with 4,591 parts by weight calcium nitrate tetrahydrate. After heating this mixture to a temperature of 70° C. the resulting solution was filtered to remove impurities and sprayed through a two material nozzle with air as the spraying gas into a concurrent air stream at a temperature of 400° C.

The yield of the end product was 2,598 parts by weight. The product contained 50.8% $P_2O_5$; 38.4% CaO and 0.15% F (fluorine factor=339) and a bulk weight of 8 grams per liter.

Example 2

2,506 parts by weight of a phosphoric acid containing 29.7% $P_2O_5$ and 0.44% fluorine (fluorine factor=67.5) were mixed with 2,494 parts by weight calcium nitrate tetrahydrate. After heating this mixture to a temperature of 110° C. the resulting solution was filtered and sprayed through a two material nozzle with steam as spraying gas at 2.4 atmospheres pressure into a concurrent air stream at a temperature of 430° C.

The yield of the end product was 1,400 parts by weight. The product contained 50% $P_2O_5$; 39.4% CaO and 0.18% F (fluorine factor=278) and had a bulk weight of 10 grams per liter.

Example 3

1,000 parts by weight phosphoric acid containing 26.4% $P_2O_5$ and 0.27% fluorine (fluorine factor=97.8) were mixed with 815 parts by weight calcium chloride hexahydrate and 200 parts by weight water. After heating this mixture to 70° C. the resulting solution was filtered and sprayed through a two material nozzle with air as the spraying gas into a concurrent air stream at a temperature of 380° C.

The yield of the end product was 496 parts by weight. Such product contained 47.9% $P_2O_5$; 38.4% CaO and 0.02% fluorine (fluorine factor=2.395) and had a bulk weight of 10 grams per liter.

Example 4

1,000 parts by weight phosphoric acid containing 26.4% $P_2O_5$ and 0.27% fluorine (fluorine factor=97.8) were mixed with 1,400 parts by weight aluminum nitrate monohydrate. After heating to 70° C. the solution was filtered and sprayed through a two material nozzle with air as the spraying gas into a countercurrent air stream at a temperature of 400° C.

The yield of the end product was 424 parts by weight. Such product contained 47.7% $P_2O_5$; 32.3% AlO and 0.2% fluorine (fluorine factor=238.5) and had a bulk weight of 327 grams per liter.

Example 5

1,000 parts by weight phosphoric acid containing 26.4% $P_2O_5$ and 0.27% fluorine (fluorine factor=97.8) were mixed with 980 parts by weight zinc nitrate (30.73% ZnO). After heating to 70° C. the solution was filtered and sprayed through a two material nozzle with air as the spraying gas into a concurrent air stream at a temperature of 420° C.

The yield of the end product was 543 parts by weight. Such product contained 43.8% $P_2O_5$ 40.27% Zn and 0.15% fluorine (fluorine factor=292) and had a bulk weight of 203 grams per liter.

Example 6

2,000 parts by weight phosphoric acid containing 26.4% $P_2O_5$ and 0.27% fluorine (fluorine factor=97.8) were mixed with 878 parts by weight calcium nitrate tetrahydrate. The solution was filtered of impurities and sprayed through a double material nozzle with air as the spraying gas into a concurrent air stream at a temperature of 380° C.

The yield of the end product was 844 parts by weight. Such product contained 58.5% $P_2O_5$; 21.8% CaO and 0.18% fluorine (fluorine factor=325) and had a bulk weight of 9 grams per liter.

Example 7

2,000 parts by weight prosphoric acid containing 26.4% $P_2O_5$ and 0.27% fluorine (fluorine factor=97.8) were mixed with 2,635 parts by weight calcium nitrate tetrahydrate. After heating to 70° C. the solution was filtered and sprayed through a two material nozzle with air as the spraying gas into an air stream in the direction of flow of the stream at a temperature of 450° C.

The yield of the end product was 1,118.5 parts by weight. Such product contained 37.75% $P_2O_5$; 45.6% CaO and 0.16% fluorine (fluorine factor=236) and had a bulk weight of 15 grams per liter.

We claim:
1. A process for producing very low bulk weight finely divided orthophosphates having a particle size of less than about one micron comprising
    (a) providing an aqueous mixture of phosphoric acid with a salt of a strong volatile acid selected from the group consisting of nitric, hydrochloric and sulfuric acids and an element selected from the group consisting of the metals of the second group of the periodic system and aluminum wherein said mixture has a molar ratio of metal oxide to phosphorus pentoxide of 0.6 to 3.5, and
    (b) spraying said mixture into an inert hot gas stream having a temperature of 190 to 450° C. to form the finely divided orthophosphates having a particle size of less than about one micron and drive off the volatile acid formed.
2. A process as in claim 1 wherein the mixture resulting from step (a) is preheated to 70 to 120° C. before spraying.
3. A process as in claim 1 wherein in step (a) rock phosphate and nitric acid are the employed in providing the phosphoric acid in said aqueous mixture.
4. A process as in claim 1 wherein said salt in step (a) is water soluble.

References Cited by the Examiner
UNITED STATES PATENTS

| | | | |
|---|---|---|---|
| 2,700,605 | 1/1955 | Hornibrook | 71—64 |
| 2,774,660 | 12/1956 | Cook et al. | 71—64 |
| 2,957,763 | 10/1960 | Barnes et al. | 71—64 |

BENJAMIN HENKIN, *Primary Examiner.*

MAURICE A. BRINDISI, *Examiner.*